(12) United States Patent
Indrieri

(10) Patent No.: US 12,238,534 B2
(45) Date of Patent: Feb. 25, 2025

(54) NETWORK EXPANSION OPTIMIZATION

(71) Applicant: T-Mobile Innovations LLC, Overland Park, KS (US)

(72) Inventor: Timothy Indrieri, San Ramon, CA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 256 days.

(21) Appl. No.: 17/948,034

(22) Filed: Sep. 19, 2022

(65) Prior Publication Data

US 2024/0098509 A1 Mar. 21, 2024

(51) Int. Cl.
*H04W 16/18* (2009.01)

(52) U.S. Cl.
CPC .................... *H04W 16/18* (2013.01)

(58) Field of Classification Search
CPC ........................................................ H04W 16/18
See application file for complete search history.

(56) References Cited

U.S. PATENT DOCUMENTS

| | | | | |
|---|---|---|---|---|
| 6,470,195 B1* | 10/2002 | Meyer | ................ | H04B 7/0491 |
| | | | | 455/562.1 |
| 7,609,648 B2* | 10/2009 | Hoffmann | ............ | H04B 7/0408 |
| | | | | 370/335 |
| 9,648,502 B2* | 5/2017 | Carey | .................... | H04W 16/18 |
| 11,856,412 B2* | 12/2023 | Singh | ..................... | H04W 16/18 |
| 2011/0242996 A1* | 10/2011 | Zhu | ........................ | H04L 41/145 |
| | | | | 370/252 |
| 2015/0302123 A1* | 10/2015 | Gloss | .................... | H04L 43/045 |
| | | | | 703/13 |
| 2016/0037357 A1* | 2/2016 | Barbosa Da Torre | ....................... | |
| | | | | H04W 16/18 |
| | | | | 455/446 |
| 2016/0127864 A1* | 5/2016 | Chang | ................... | G01S 5/0268 |
| | | | | 455/456.1 |
| 2019/0087840 A1* | 3/2019 | Zachariah | .......... | G06Q 30/0205 |
| 2019/0364532 A1* | 11/2019 | Jain | ....................... | H04W 16/22 |
| 2021/0334294 A1* | 10/2021 | Messmer | ............. | H04W 64/003 |
| 2022/0028246 A1* | 1/2022 | Chang | ................... | H04W 4/029 |
| 2023/0180017 A1* | 6/2023 | Gadalin | ................ | H04W 16/14 |
| | | | | 370/328 |
| 2023/0199512 A1* | 6/2023 | Guill, Jr. | ................ | H04W 24/08 |
| | | | | 370/254 |
| 2024/0098509 A1* | 3/2024 | Indrieri | .................. | H04W 16/18 |
| 2024/0292369 A1* | 8/2024 | Jantzi | .................. | H04W 64/003 |

FOREIGN PATENT DOCUMENTS

| | | | | | |
|---|---|---|---|---|---|
| CN | | 107666670 A | * | 2/2018 | ............. H04W 16/18 |
| WO | WO-2019236851 A1 | * | 12/2019 | ......... H04L 41/0896 |
| WO | WO-2023187336 A1 | * | 10/2023 | ............ G01S 5/0252 |

* cited by examiner

*Primary Examiner* — Adam D Houston

(74) *Attorney, Agent, or Firm* — Shook, Hardy & Bacon L.L.P.

(57) ABSTRACT

Systems and methods are provided herein to dynamically and efficiently optimize network expansion of a network carrier based on UE data collected from a plurality of user equipment (UEs). The UE data is processed based on different computerized algorithms to locate optimal locations for adding a new access point to expand the network. Aspects herein are also directed to systems and methods for generating and displaying dynamic maps on graphical user interfaces (GUI) in accordance with aspects herein.

20 Claims, 7 Drawing Sheets

NETWORK EXPANSION OPTIMIZATION

BACKGROUND

Currently, network expansion decisions are made by measuring coverage of a network of the network carrier at particular geographic locations. If a gap in network coverage is identified, the network carrier can determine whether a new access point (e.g., a new cell site) would make business sense and provide an improved quality of service to a subscriber user equipment (UE/UEs). For example, presently, if network expansion is being considered for a particular geographic location of interest, the network carrier deploys an employee to drive through the particular geographic location of interest to perform a drive test for signal detection by one or more UEs and to collect network coverage data. Additionally, the network carrier may try to access Census data to make network expansion determinations, which may not always be reliable since it may be outdated at the time the network carrier accesses the Census data to make network expansion determinations. The current methods outlined above, therefore, require significant human and other resources to be allocated to the task. As such, a more efficient and up-to-date process of collecting and processing the necessary data for supporting network expansion decisions for a network carrier is needed.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for implementing computerized algorithms useable for computing optimal location(s) for network expansion are disclosed. Generally, when a UE subscribes to a network of a network carrier and connects to the network, the UE is configured to collect UE data regarding the UE including, for example, a service state of the UE, a particular geographic location of the UE with a time stamp, an identification code of the UE (UE ID code), an identification code of the cell (Cell ID) providing service to the UE at the particular geographic location and time, an identification code of a network carrier (Carrier ID) providing service to the UE at the particular geographic location and time, and the like.

The systems and methods in accordance herein address the shortcomings of current and old methods of planning and implementing network expansion by harnessing UE data collected from a plurality of user equipment (UEs) and implementing computerized algorithms to efficiently optimize network expansion of a network carrier. Particularly, the present systems are more efficient than older systems because they allow a network carrier to access greater numbers of geographic locations than current methods, thereby reducing or eliminating the necessity for presence based drive by network tests.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
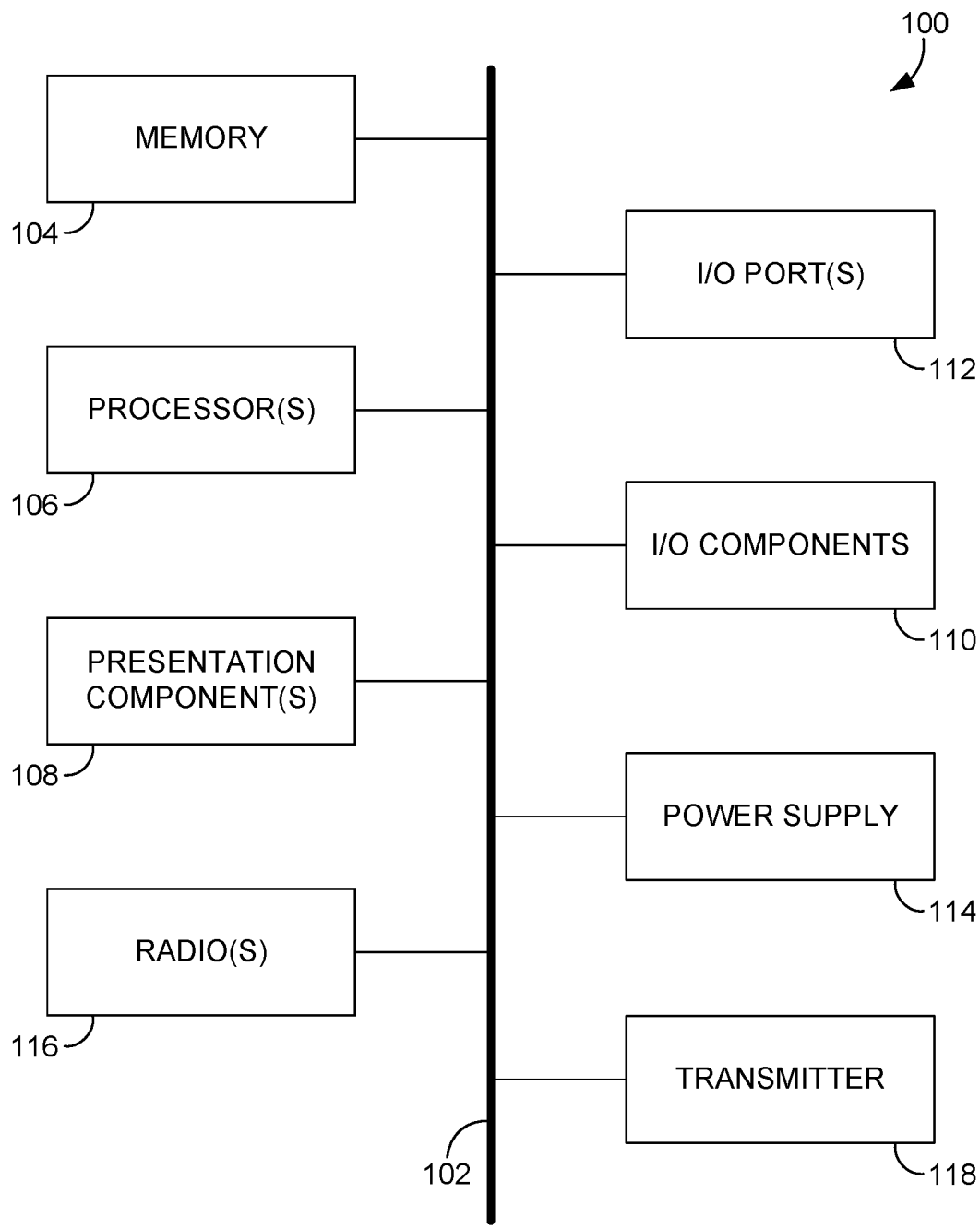
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, $32^{nd}$ Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, 6G, satellite based wireless networks, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, gaming consoles, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information for the UE. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

A service state of the UEs may include, for example, an in-service state when a UE is in-network (i.e., using services of a primary provider (i.e., home network provider) to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out-of-service state when there are no service providers at the particular geographic location of the UE.

In accordance with aspects herein, the UE data may be collected at predetermined time intervals measured in nanoseconds, milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. In some aspects, the UE data may be continuously or intermittently communicated to the UE's primary provider for storage by the primary provider at a primary provider's database. When the UE data is stored in the cloud based storage database or the database associated with the primary provider, the data may be stored in association with a data identifier mapping the UE data back to the UE, or alternatively, the UE data may be collected without an identifier for anonymity.

Aspects herein include systems, methods, and computer readable media for optimizing a carrier's network expansion for a network carrier (i.e., home network carrier) to identify optimal sites for new access points such as, for example, new base stations, antennas, cells, and the like to expand the carrier's network, allowing it to cover a larger geographic area for provision of, for example, wireless services, using the UE data. As provided briefly above, the current methodologies used for network expansion are largely analog and require significant human and other resources. Additionally, the Census information that may be used and accessed for network expansion purposes may be outdated. As such, the identification or determination of optimal sites for new access points based on current methodologies may be miscalculated resulting in large negative economic impact with little benefit to the network coverage of the network carrier in being able to provide, for example, wireless services to a greater population by covering a larger number of geographic locations and/or providing higher quality of service to densely populated geographic locations.

In accordance with a first aspect of the present disclosure, a system that takes advantage UE data collected from a plurality of UEs subscribed to a home network carrier, is provided. The system uses the UE data to identify optimal locations for deployment of new access points resulting in efficient expansion of the home network carrier's network with the greatest impact to the coverage and quality of service provided by the home network. As provided briefly above, a UE is capable of collecting UE data, which is information about its service state status, its current geographic location, a current time, a wireless signal strength, available networks, channel quality, and the like, as long as it is powered on. For example, the UE may collect and initially store the UE data at a memory of the UE, which may be accessed and retrieved by the home network carrier at predetermined time intervals (e.g., seconds, minutes, hours, days, months and the like). The UE may be configured to automatically manage the UE data collected and saved in the memory of the UE by automatically deleting old UE data at predetermined time intervals (e.g., minutes, hours, days, and the like) to make space for new UE data once the data has been collected by the home network carrier, or alternatively, regardless of whether the data has been collected by the home network carrier. Alternatively, the UE may alert a user of the UE to clear the memory to make room for new data, or the network carrier may remotely manage at least a portion of the memory of the UE by automatically deleting data from the memory of the UE as it is retrieved by the home network carrier.

The home network carrier may store the data retrieved from the UE at one or more network databases that may be physical or cloud based. The home network carrier may then access and process the UE data according to aspects disclosed herein. The one or more network databases comprise UE data collected from a plurality of UEs subscribed to the home network carrier. The home network carrier uses one or more processors to process the UE data collected from the plurality of UEs based on computer based algorithms or data structures.

The system in accordance with aspects herein determines one or more geographic locations and divides the one or more geographic locations into a plurality of geographic areas having a predetermined shape and size. For example, each geographic area in the plurality of geographic areas may be defined by a hexagon shape where each vertex of the hexagon corresponds to a specific latitude and longitude coordinate on a map. The hexagon shapes for each of the plurality of geographic areas may be contiguously stacked on the map (i.e., with overlapping perimeters) so that collectively, they cover a geographic location of interest. A size for each geographic area may be predetermined by the home network carrier based on a desired granularity (i.e., level of detail) desired for the computer based algorithm or data structure. For example, each geographic area may be 0.001 km$^2$, 0.01 km$^2$, 0.1 km$^2$, 0.2 km$^2$, 0.5 km$^2$, 1 km$^2$, 1.5 km$^2$, 2 km$^2$, 2.5 km$^2$, 3 km$^2$, 3.5 km$^2$, 4 km$^2$, etc. Each geographic area may have zero or at least one UE that is powered on and collecting UE data. Although described as having a hexagon shape, it is contemplated that any suitable shape may be used for defining each geographic area such as rectangular, triangular, pentagonal, octagonal, and the like.

A threshold number of UEs having a same service state may be used to classify a geographic area as being in an in-service state, a roaming state, an emergency only state, or an out-of-service state. For example, depending on the size of the geographic area, the threshold number may be anywhere from 1 to 100. For example, if the area is 0.001 km$^2$, the area may be 1; if the area is 0.01 km$^2$, the threshold number may be between 2 and 10; if the area is 0.1 km$^2$, the threshold number may be anywhere between 10 and 100; and the like. In other words, the threshold number may be predetermined by the carrier depending on the granularity desired.

Once the geographic areas are classified, clusters of geographic areas of the same kind may be formed by applying a grid to the geographic location defined by, for example, a zip code. In other words, each geographic location may be bound by zip code boundaries. For example, the grid may be comprised of intersecting lines forming rectangles of a predetermined size (e.g. 0.1 square mile squares, i.e., 160.934 square meters). In order to be clustered, each rectangle in the grid must have at least a threshold number of geographic areas (e.g., 15, 10, 5, etc.) classified as being in one of the roaming state, the emergency only state, or the out-of-service state, and be a threshold distance away from another rectangle in the grid meeting the same parameters. Then, in order to form a cluster, a threshold number of rectangles in the grid must be grouped together at the geographic location. For example, a cluster may be formed if at least 15 grids are clustered together, meaning that each has at least the threshold number of geographic areas and is within the threshold distance away from another clustered rectangle. These and other aspects will become more apparent in view of the figures.

Once clusters of rectangles having, for example, geographic areas suffering from no network coverage and/or poor network coverage (i.e., UEs report no service state, roaming state, or emergency only state) are formed, an optimal location for a potential new access point is determined by finding the centroid of each cluster, where the centroid is located within a predetermined distance away from an end point of the cluster (i.e., a point or rectangle located at the cluster boundary). If the centroid is located the distance from the end point and the initial centroid is greater than the predetermined distance, a new centroid is determined using the initial centroid as a cluster as another end point. This calculation is repeated until all centroids are within the predetermined distance away from the point(s) located at the cluster boundary. Thus, the centroid(s) represents the optimal location for placing a new access point that will service the geographic location to solve the no coverage and/or the poor coverage geographic location(s).

It should be understood that based on the population densities being different in different locations, for example, urban v. rural, and the like, the thresholds are dynamic, meaning that they can be changed to account for the population densities. For example, the threshold number of geographic areas required within each rectangle of the grid may be smaller for rural areas as opposed to urban areas in order to be clustered; and the number of clustered rectangles required to form a cluster may be greater for rural areas as compared to urban areas. The dynamic thresholds allow for reduction of noise, meaning that the geographic areas that don't meet the dynamic threshold requirements are not clustered, or in other words, they are not grouped together.

Although, the description provided above describes "a grid," it is contemplated that separate grids may be applied for different UE states, for example, one grid may be applied for clustering rectangles having geographic areas that are in a no service state, clustering rectangles having geographic areas that are in a roaming state, and clustering rectangles having geographic areas that are in an emergency only state. Based on the UEs having mobility within the geographic location(s), it is contemplated that the grids will overlap with one another in some geographic locations, which help further define the boundaries of each cluster. Once the boundaries of a cluster are defined, value of a new access point (i.e., return on investment) may be determined to be higher for clusters having a minimum number of UEs reporting data showing that they are in an out-of-service and/or emergency only state. For example, each rectangle in a cluster must have at least 100 UEs, to create value for the home carrier from the new access point.

Another aspect of the present disclosure is directed to a computer implemented method for generating an interactive graphical user interface that is configured to display network coverage information. The method includes the steps of retrieving UE data from a plurality of UEs subscribed to a home network carrier, where the UE data includes at least a service state and a geographic location of each UE of the plurality of UEs, storing the UE data in a database of the home network carrier, processing the UE data stored in the database for determining clusters of gridded geographic areas having poor network coverage and/or no network coverage. For each cluster, determining an optimal location for deploying a new access point by calculating a centroid for each cluster. Further, once the centroids are determined, dynamically displaying on the graphical user interface a dynamic map showing different visual characteristics for the cluster(s) along with their centroids.

Further, in some aspects, the computer implemented method may further include using satellite data to determine whether the location(s) of the centroid(s) are viable locations for building the new access point(s). For example, if the satellite data indicates that a centroid's location coincides with a competitor's access point, the location may be viable since it may be possible to add an access point to the existing access point. However, if the satellite data indicates that the centroid's location coincides with a single family residence, or the middle of a street, road, highway lane, and the like, the determined location of the centroid may not be a viable location and thus, further adjustments may be needed to determine an optimal location for deploying the new access point.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 present data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, 6G, satellite based, other VoIP communications, etc. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
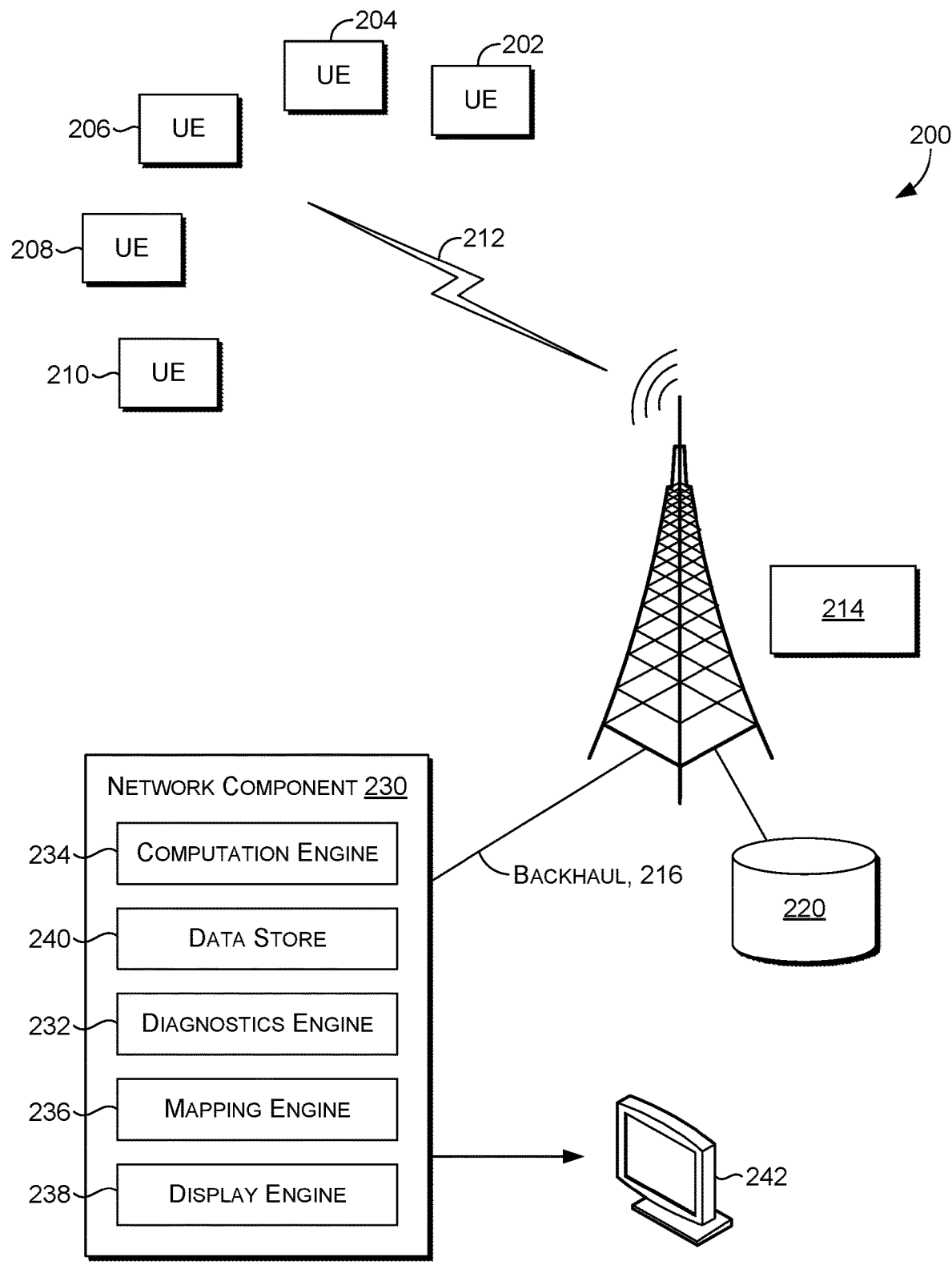
FIG. 2 depicts a computing environment suitable for use in implementations of the present disclosure, in accordance with aspects herein.

Next, FIG. 2 provides an exemplary network environment in which implementations of the present disclosure may be employed. Such a network environment is illustrated and designated generally as network environment 200. Network environment 200 is not to be interpreted as having any dependency or requirement relating to any one or combination of components illustrated.

Network environment 200 includes user devices (UE) 202, 204, 206, 208, and 210, access point 214 (which may be a cell site, base station, or the like), and one or more communication channels 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, each of the UEs 202, 204, 206, 208, and 210 may correspond to computing device 100 in FIG. 1. Thus, a UE can include, for example, a display(s), a power source(s) (e.g., a battery), a data store(s), a speaker(s), memory, a buffer(s), a radio(s) and the like. In some implementations, for example, a UEs 202, 204, 206, 208, and 210 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, satellite based, LTE, CDMA, or any other type of network.

In some cases, UEs 202, 204, 206, 208, and 210 in network environment 200 can optionally utilize one or more communication channels 212 to communicate with other computing devices (e.g., a mobile device(s), a server(s), a personal computer(s), etc.) through access point 214. The network environment 200 may be comprised of a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network environment 200 can include multiple networks, as well as being a network of networks, but is shown in more simple form so as to not obscure other aspects of the present disclosure.

The one or more communication channels 212 can be part of a telecommunication network that connects subscribers to their immediate telecommunications service provider (i.e., home network carrier). In some instances, the one or more communication channels 212 can be associated with a telecommunications provider that provides services (e.g., 3G network, 4G network, LTE network, 5G network, 6G network and the like) to user devices, such as UEs 202, 204, 206, 208, and 210. For example, the one or more communication channels may provide voice, SMS, and/or data services to UEs 202, 204, 206, 208, and 210, or corresponding users that are registered or subscribed to utilize the services provided by the telecommunications service provider. The one or more communication channels 212 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UEs 202, 204, 206, 208, and 210, that are located within the geographic area, or cell, covered by radio antennas of access point 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with a network component 230 and at least a network database 220 via a backhaul channel 216. As the UEs 202, 204, 206, 208, and 210 collect individual status data, the status data can be automatically communicated by each of the UEs 202, 204, 206, 208, and 210 to the access point 214. Access point 214 may store the data communicated by the UEs 202, 204, 206, 208, and 210 at a network database 220. Alternatively, the access point 214 may automatically retrieve the status data from the UEs 202, 204, 206, 208, and 210, and similarly store the data in the network database 220. The data may be communicated or retrieved and stored periodically within a predetermined time interval which may be in seconds, minutes, hours, days, months, years, and the like. With the incoming of new data, the network database 220 may be refreshed with the new data every time, or within a predetermined time threshold so as to keep the status data stored in the network database 220 current. For example, the data may be received at or retrieved by the access point 214 every 10 minutes and the data stored at the network database 220 may be kept current for 30 days, which means that status data that is older than 30 days would be replaced by newer status data at 10 minute intervals. As described above, the status data collected by the UEs 202, 204, 206, 208, and 210 can include, for example, service state status, the respective UE's current geographic location, a current time, a strength of the wireless signal, available networks, and the like.

The network component 230 comprises various engines including a diagnostics engine 232, a computation engine 234, a mapping engine 236, a display engine 238, and a data store 240. All determinations, calculations, and data further generated by the diagnostics engine 232, the computation engine 234, the mapping engine 236, and the display engine 238 may be stored at the data store 240. Although the network component 230 is shown as a single component comprising the diagnostics engine 232, the computation engine 234, the mapping engine 236, the display engine 238, and the data store 240, it is also contemplated that each of the diagnostics engine 232, the computation engine 234, the mapping engine 236, and the display engine 238, and the data store 240 may reside at different locations, be its own separate entity, and the like, within the home network carrier system.

The network component 230 is configured to retrieve the status data from the network database 220 and calculate various values that are useable for displaying a dynamic graphical user interface (GUI). The diagnostics engine 232 determines a service state (i.e., out-of-service, emergency only service, or in-service) of each UE data associated with a chosen geographic location (e.g., state, city, county, town, neighborhood, landmark, and the like) and a particular period or range of time of interest, and the mapping engine 236, and the display engine 238 are configured to generate mapping data and display data to display a dynamic map on a network display device 242.

A map of a chosen geographic location based on, for example a zip code, may be displayed on network display device 242. In the map, for example, land masses and water may be presented with different visual characteristics. For example, water may be displayed as blank area(s) and the land masses may be shaded/hatched/stippled/colored. Further, the map may also show the land masses further divided into geographic areas of a predetermined size having different service states, e.g., an in-service state, an out-of-service state, an emergency only state, an in-service state, with yet further differing visual characteristics, as will be described in greater detail below. The computation engine 234 may use the service state determined by the diagnostics engine 232 to perform different calculations and make different determinations such as, for example, optimal sites for new access points.

Figure 3:
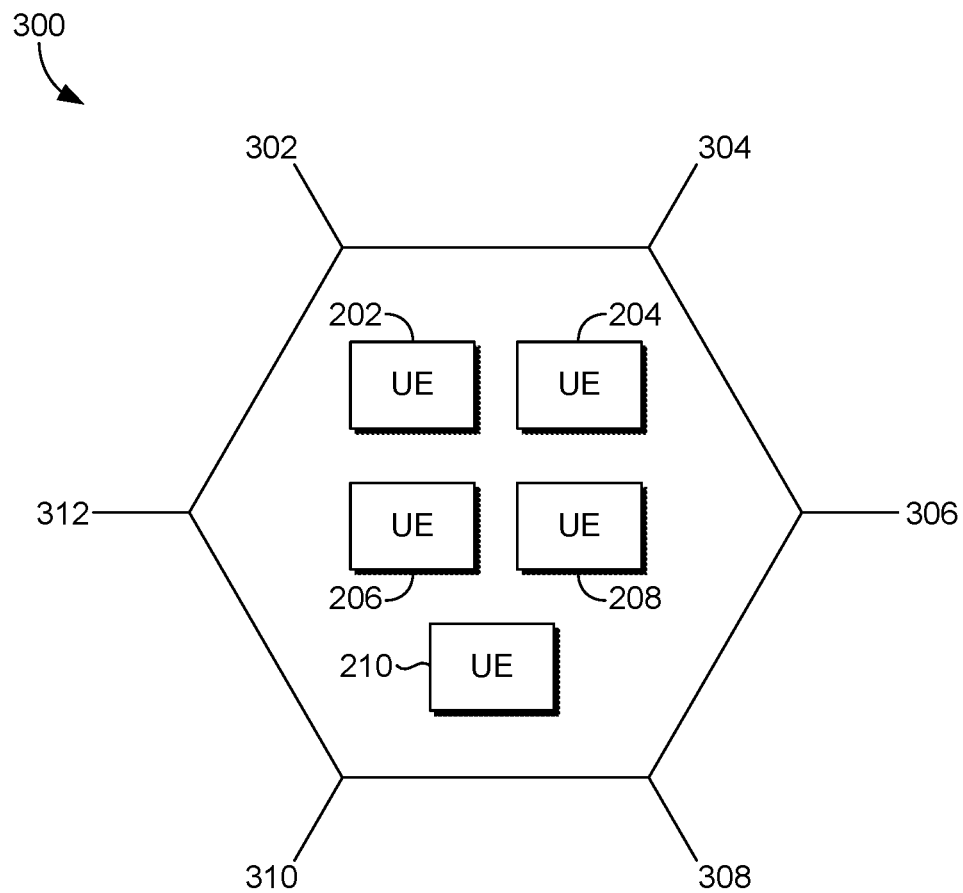
FIG. 3 illustrates a geographic area as defined in accordance with aspects herein.

The computation engine 234 may determine a plurality of geographic areas within the chosen geographic location. Each geographic area in the plurality of geographic areas may have a particular shape that is stackable such that they can continuously cover the land masses on any map of any geographic location. For example, as shown in FIG. 3, each geographic area in the plurality of geographic areas may have a hexagonal shape such as hexagon representing a geographic area 300 having vertices 302, 304, 306, 308, 310, and 312, each vertex representing a specific map coordinate comprised of a specific latitude and longitude pair. The size of the geographic area 300 may be predetermined based on a level of granularity, detail, and/or accuracy desired for the determinations/calculations done by the systems, computerized methods, and computer-storage media. A plurality of UEs collecting UE data may be located within each geographic area at a given time. For example, as shown in FIG. 3, UEs 202, 204, 206, 208, 210, may be located within geographic area 300 collecting UE data that is useable by network component 230, in accordance with aspects herein.

Figure 4:
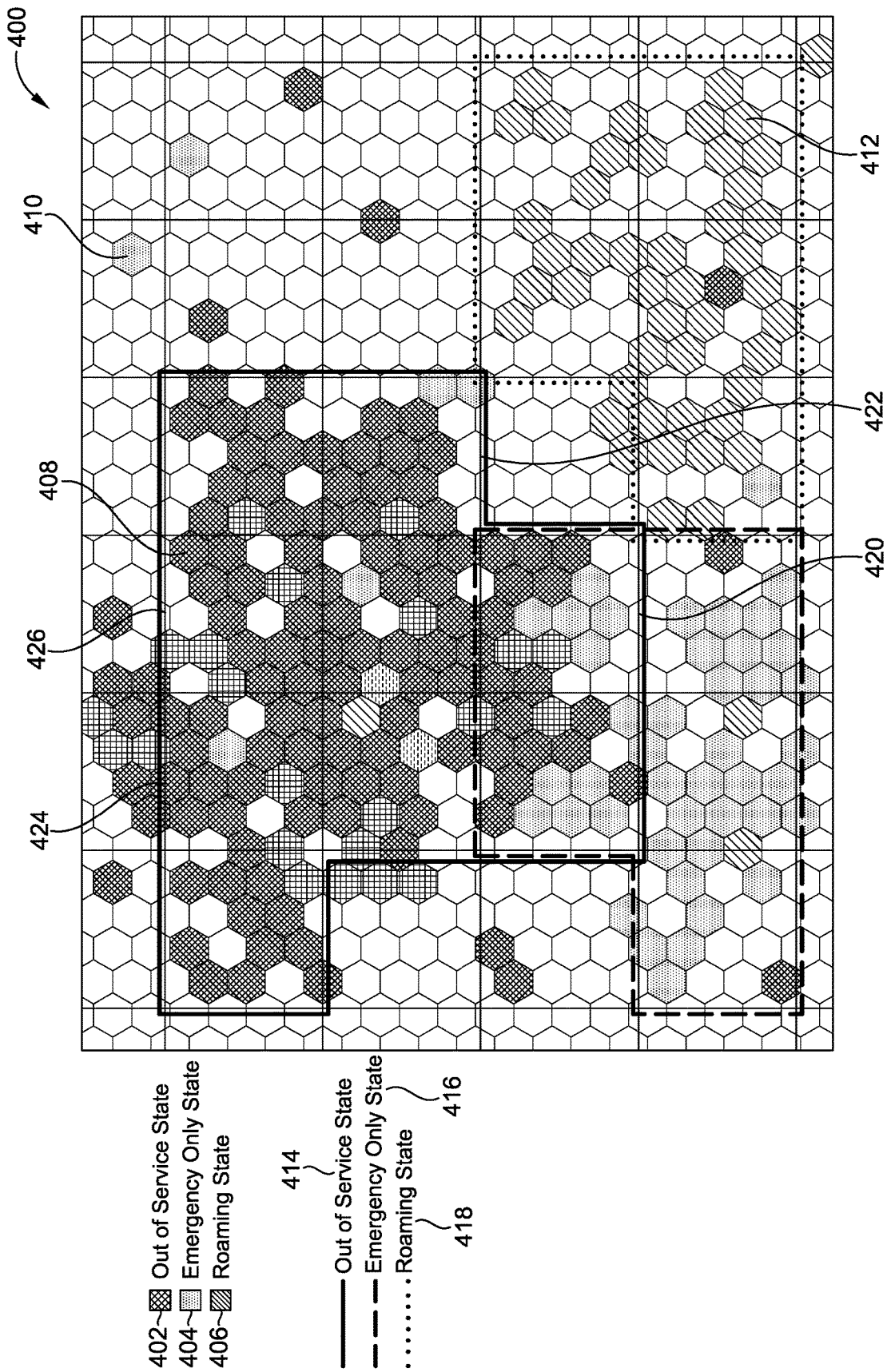
FIG. 4 illustrates a screenshot of a map in which implementations of the present disclosure may be employed.

Based on the service state determinations made by the diagnostics engine 232, computation engine 234 can classify each geographic area as having a service state classifiable as in-service, out-of-service, emergency only service, or roaming. Based on the classified geographic areas, the computation engine 234 may apply one or more grids of a predetermined size to the land masses having geographic areas classified as having an out-of-service state, an emergency only state, or a roaming state, as shown in FIG. 4. A size of each rectangle in the grid may be dynamically determined based on whether the land mass corresponds to a rural area or an urban area.

For illustrative purposes, as shown in FIG. 4, for example, if the land mass 400 is in an urban area, the grid may be divided into rectangles/squares covering 0.1 square miles (160.934 square meters). Further, as shown, one or more grids may be applied to the same land mass for forming different clusters of geographic areas having different states. For example, as shown, the land mass may have geographic areas classified as being in an out-of-service state 402 (e.g., geographic area 408), an emergency only state 404 (e.g., geographic area 410), or a roaming state (e.g., geographic area 412). Thus, in order to form clusters of geographic areas that could potentially benefit from a new access point, one or more grids may be applied to the land mass. For example, an out-of-service state grid 414, an emergency only state grid 416, and a roaming state grid 418. As shown, certain rectangles/squares of the different grids may overlap because they may enclose a combination of geographic areas, such as, for example, square 420, or may not overlap, such as, for example, square 422. In order to be clustered, each square must have at least a threshold number of geographic areas having the specific state of the grid. In other words, in order for a square of an out-of-service state grid 414 to be clustered with another out-of-service state grid 414, the rectangles/squares must be within a threshold distance apart from each other and have at least a threshold number of geographic areas classified as being in an out-of-service state 402. For example, if the threshold number is ten, squares 424 and 426 may be clustered together because they each have at least ten geographic areas enclosed within, that are classified as being in the out-of-service state 402 and are considered neighboring squares because they are within a predetermined threshold distance apart from each other (e.g., ε=0.3, ε=0.4, ε=0.5, ε=0.6). In other words, the predetermined threshold distance apart for neighboring squares can be used to determine which squares should be clustered together or included in a cluster.

In accordance with aspects herein, in order to be considered a cluster, a further requirement may be that the cluster include at least a threshold number of rectangles/squares. For example, continuing with the example of an urban area, the minimum threshold number of squares needed to form a cluster may be set to 15. Further, in order to reduce noise, another threshold imposed on the data may be that each square contain data collected from at least 100 UEs. Depending on a desired return on investment, this threshold may be moved up or down. That is, the higher the threshold requirement for UE data, the higher the return on investment will be because the higher the number of UEs detected in a geographic area, the denser a population is in said geographic area.

Figure 5:
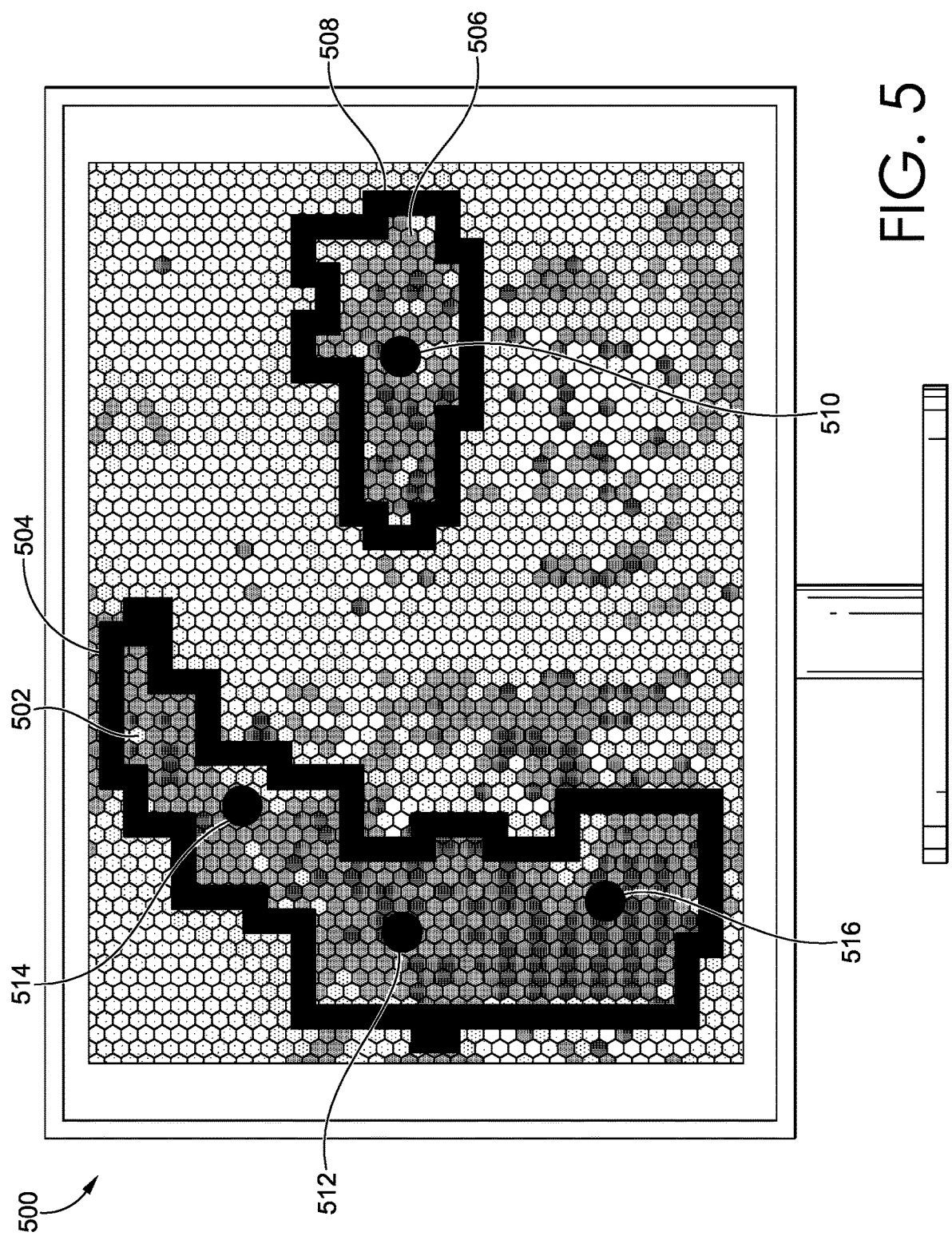
FIG. 5 illustrates a screenshot of a map in which implementations of the present disclosure may be employed.

As shown in FIG. 5 (not drawn to scale), once the clusters of geographic areas having a no service state, an emergency only state, and/or a roaming state are determined, computation engine 234 can further determine a cluster boundary based on the squares that are located at the edge(s) of each cluster. For example, as shown in FIG. 5, for a geographic location 500, a first cluster 502 having a cluster boundary 504 and a second cluster 506 having a cluster boundary 508 were determined. In the case of second cluster 506 being a smaller cluster, a centroid 510 may be determined by adding the coordinates of the points forming the cluster boundary 508 and dividing each coordinate sum by the total number of coordinates added. If the centroid 510 is found to be located within a threshold distance away from every coordinate forming the cluster boundary (e.g. 1 mile or 1609.34 meters), the centroid 510 is determined as being an optimal location for deploying a new access point that will efficiently and effectively solve a network coverage hole in the second cluster 506.

However, in cases where the clusters are large, where a centroid is not within a threshold distance away from every coordinate forming the cluster boundary as shown for the first cluster 502, the calculation for determining a centroid 512 can be repeated multiple times to determine additional centroids 514 and 516 until every coordinate forming the cluster boundary 504 is within the threshold distance away from one of the determined centroids 512, 514, or 516. In other words, each centroid 512, 514, and 516 is within the threshold distance away from at least a portion of the coordinates forming the cluster boundary 504. The second and subsequent calculations may start from the coordinates of the initial centroid 512 to determine the secondary centroid(s) 514/516 that sits between the cluster boundary 504 and the initial centroid 512. Thus, for larger clusters, multiple sites for future access point may be determined to efficiently and effectively solve network coverage holes experienced in larger clusters.

As further shown in FIG. 5, the mapping engine 236 and the display engine 238 may process data to generate a graphical user interface displaying, for example, the clusters 502 and 506 with the determined optimal sites for future deployment of access points represented by the centroids 510, 512, 514, and 516. Further, in accordance with aspects herein, display of the cluster boundaries 504 and 508 may be turned on or off, depending on what an operator desires to see. Further, a map and the data layers displayed may be dynamic in that the operator may be able to zoom in and out as needed, and turn on and off different data layers as needed, without departing from aspects disclosed herein.

As provided briefly above, the size of each square in a grid may be dynamically changed depending on the type of geographic location (i.e., rural, urban, island, peninsula, and the like). For example, each rectangle in the grid may cover an area ranging between 0.05 to 2 miles. Further, the number of geographical areas required within a rectangle of the grid for clustering may also be also be dynamically changed between 1 and 100 depending on the level of granularity desired for the type of geographic location. Furthermore, another parameter that can be dynamically changes may be the minimum number of rectangles required for forming a cluster, depending on the economic value and coverage granularity. For example, the greater the number of rectangles in a cluster, the greater the number of geographic areas that can be covered by the grid.

Accordingly, according to the aspects herein, a home network carrier can make determinations and calculations for efficiently determining optimal sites for new access points that would allow for the home network to expand its reach and provide better and more expansive coverage to subscriber UEs. Further, unlike the traditional methods, according to aspects herein, the home network carrier can make these determinations in real time or near real time, based on current data, which makes more sense technically and economically.

Figure 6:
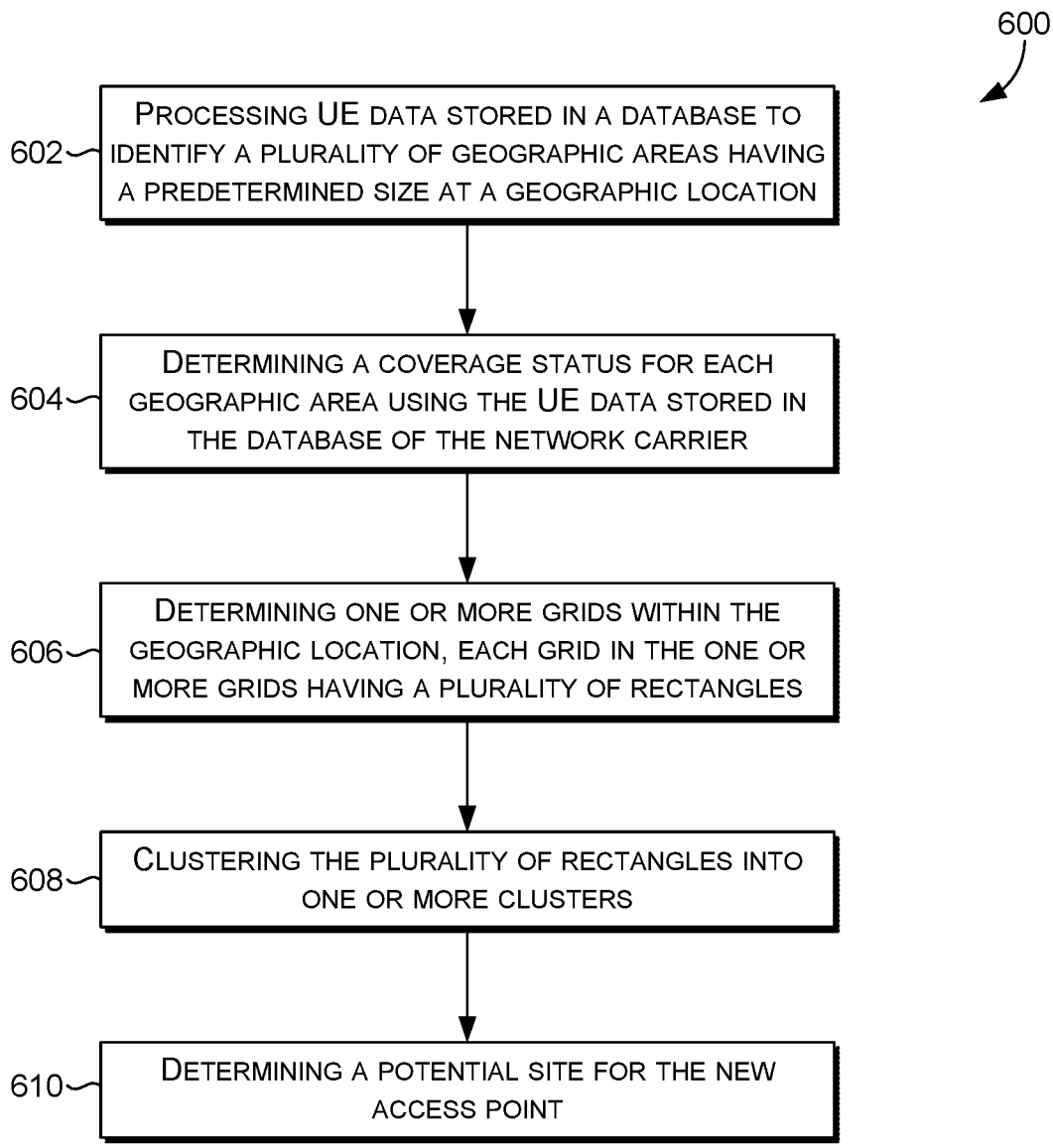
FIG. 6 illustrates a flow diagram of an exemplary method for dynamically implementing the computerized algorithms, in accordance with aspects herein.

As depicted in FIG. 6, a method 600 can include processing UE data collected from a plurality of user equipment (UEs) subscribed to a home network carrier at a particular geographic location within a predetermined time period. The UE data can include a service state of the UE, a particular geographic location of the UE with a time stamp, an identification code of the UE (UE ID code), an identification code of the cell (Cell ID) providing service to the UE at the particular geographic location and time, an identification code of a network carrier (Carrier ID) providing service to the UE at the particular geographic location and time, and the like. The UE data may be stored in a database of the home network carrier, and as depicted in block 602, the method 600 can include processing the data stored in the database of the home network carrier to identify a plurality of geographic areas having a predetermined size at a geographic location. Each geographic area in the plurality of geographic areas can have a particular shape that is stackable on a map. For example, the geographic area can have a hexagonal shape, with each vertex representing a latitude and longitude coordinate of a map. Each geographic area in the plurality of geographic areas can further be of a predetermined size. For example, each geographic area in the plurality of geographic areas may be 0.001 km², 0.01 km², 0.1 km², 0.2 km2, 0.5 km², 1 km², 1.5 km², 2 km², 2.5 km², 3 km², 3.5 km², 4 km², etc.

As depicted in block 604, some aspects of method 600 include a step of computing a coverage status for each geographic area such a having an in-service state, an out-of-service state, an emergency only service state, or a roaming service state. Additionally as depicted in block 606, the method 600 can include a step of determining a one or more grids having a plurality of rectangles within the geographic location based on the coverage status of the geographic area having no network coverage or having poor network coverage based on the service state of the geographic areas having the out-of-service state, the emergency only service state, and/or the roaming service state. Further, as shown in block 608, the plurality of rectangles may be clustered according to the geographic areas within the rectangles having no coverage and/or poor coverage. Once the cluster boundaries are determined for each or the one or more clusters, a centroid may be calculated or determined for each cluster as shown in block 610. The centroid represents an optimal site for adding a new access point that would resolve or improve network service holes experienced at the one or more clusters.

Figure 7:
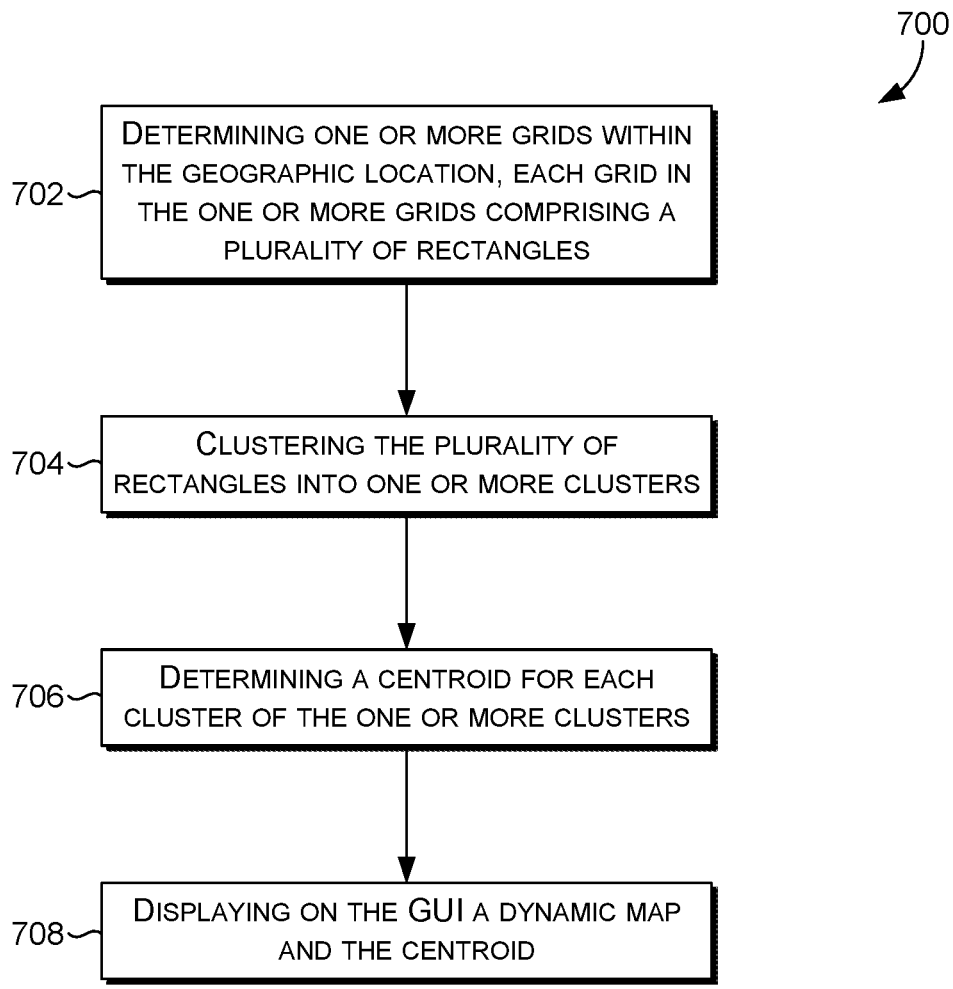
FIG. 7 illustrates a flow diagram of an exemplary method for dynamically implementing the computerized algorithms, in accordance with aspects herein.

As depicted in FIG. 7, a method 700 for displaying the centroid is provided. As depicted in block 702, the method 700 can include the step of determining one or more grids within the geographic location, each grid in the one or more grids comprising a plurality of rectangles. Further, the method may include clustering the plurality of rectangles into one or more clusters as shown at block 704, and determining a centroid for each cluster as shown at block 706. Once the centroid is determined, the method may include generating a graphical user interface for displaying a dynamic map, as shown at block 708, where the dynamic map can include the centroid and other layers of information such as cluster boundaries, and the like which can be optionally displayed.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for determining an optimal location for a new access point, the method comprising:
   processing UE data stored in a database to identify a plurality of geographic areas having a predetermined size at a geographic location;
   determining a coverage status for each geographic area of the plurality of geographic areas using the UE data stored in the database of the network carrier;
   determining one or more grids within the geographic location based on the coverage status of the plurality of geographic areas having no network coverage or poor network coverage, wherein each grid in the one or more of grids comprises a plurality of rectangles;
   clustering the plurality of rectangles into one or more clusters, wherein each cluster of the one or more clusters comprises at least a first threshold number of rectangles, wherein each rectangle in the plurality of rectangles comprises at least a second threshold number of geographic areas enclosed therein; and
   determining a centroid for the each cluster of the one or more clusters, wherein the centroid represents a potential site for the new access point.

2. The computer-implemented method of claim 1, wherein the no network coverage or poor network coverage is based on the UE data indicating an emergency only service state, a roaming service state, and/or a no service state.

3. The computer-implemented method of claim 1, wherein the centroid is determined by adding a total number of coordinates defining a cluster boundary for the each cluster to calculate a coordinate sum and dividing the coordinate sum by the total number of coordinates to determine centroid coordinates of the centroid.

4. The computer-implemented method of claim 3, wherein the centroid coordinates of the centroid are within a third threshold distance away from each of the total number of coordinates defining the cluster boundary.

5. The computer-implemented method of claim 3, wherein the centroid coordinates of the centroid are not within a third threshold distance away from each of the total number of coordinates defining the cluster boundary and determining a second centroid having second centroid coordinates located within the third threshold distance away from the centroid coordinates of the centroid and from each at least a portion of the total number of coordinates defining the cluster boundary.

6. The computer-implemented method of claim 5, wherein the second centroid represents a potential site for an additional new access point.

7. The computer-implemented method of claim 1, wherein each rectangle of the plurality of rectangles is of a predetermined size.

8. The computer-implemented method of claim 7, wherein the predetermined size of the each rectangle is between 0.05 to 2.0 miles.

9. The computer-implemented method of claim 7, wherein the predetermined size the each rectangle is 0.1 miles.

10. The computer-implemented method of claim 1, wherein the first threshold number of rectangles is $\geq 5$.

11. The computer-implemented method of claim 1, wherein the second threshold number of geographical areas is $\geq 2$.

12. The computer-implemented method of claim 1, wherein the first threshold number of rectangles within each cluster is $\geq 10$.

13. The computer-implemented method of claim 1, wherein the first threshold number of rectangles within each cluster varies according to a type of the geographic location.

14. The computer-implemented method of claim 13, wherein the type of the geographic location can be either urban or rural, and wherein the first threshold number of rectangles is greater in a rural cluster compared to an urban cluster.

15. The computer-implemented of claim 1, further comprising using satellite data to determine whether the potential site for the new access point is located at a viable location.

16. A computer-implemented method for generating an interactive graphical user interface (GUI) configured to display network coverage information of a home network carrier, the method comprising:
   processing the UE data stored in a database to identify a plurality of geographic areas;
   determining a coverage status for each geographic area of the plurality of geographic areas using the UE data stored in the database of the network carrier;
   determining one or more grids within a geographic location based on the coverage status of the plurality of geographic areas having no network coverage or poor network coverage, wherein each grid in the one or more of grids comprises a plurality of rectangles;
   clustering the plurality of rectangles into one or more clusters, wherein each cluster of the one or more clusters comprises at least a first threshold number of rectangles, wherein each rectangle in the plurality of rectangles comprises at least a second threshold number of geographic areas enclosed therein;

determining a centroid for the each cluster of the one or more clusters, wherein the centroid represents a potential site for a new access point; and displaying on the GUI a dynamic map, wherein the centroid is displayed with a first visual characteristic that is visually distinct from a second visual characteristic of the plurality of geographic areas.

17. The computer-implemented method of claim 16, wherein the no network coverage or poor network coverage is based on the UE data indicating an emergency only service state, a roaming service state, and/or a no service state.

18. The computer implemented method of claim 16, wherein the centroid is determined by adding a total number of coordinates defining a cluster boundary for the each cluster to calculate a coordinate sum and dividing the coordinate sum by the total number of coordinates to determine centroid coordinates of the centroid.

19. The computer-implemented method of claim 18, further comprising displaying the cluster boundary for the each cluster in the one or more clusters.

20. The computer-implemented method of claim 16, wherein each rectangle of the plurality of rectangles is of a predetermined size.

\* \* \* \* \*